(12) United States Patent
Bogue et al.

(10) Patent No.: US 9,884,343 B2
(45) Date of Patent: *Feb. 6, 2018

(54) CLOSURE OF COOLING HOLES WITH A FILLING AGENT

(71) Applicant: UNITED TECHNOLOGIES CORPORATION, Farmington, CT (US)

(72) Inventors: William Bogue, Hebron, CT (US); Ron I. P. E. Prihar, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 967 days.

This patent is subject to a terminal disclaimer.

(21) Appl. No.: 13/722,253

(22) Filed: Dec. 20, 2012

(65) Prior Publication Data

US 2014/0174092 A1 Jun. 26, 2014

(51) Int. Cl.
*B05D 7/22* (2006.01)
*F23R 3/00* (2006.01)
(Continued)

(52) U.S. Cl.
CPC ................ *B05D 7/22* (2013.01); *C23C 4/02* (2013.01); *F01D 5/005* (2013.01); *F01D 5/288* (2013.01);
(Continued)

(58) Field of Classification Search
CPC . B05D 7/22; B05D 7/222; F23R 3/002; F23R 2900/00016; F23R 2900/00019;
(Continued)

(56) References Cited

U.S. PATENT DOCUMENTS 5,441,767 A * 8/1995 DeSaulniers ........... C23C 10/02
427/156
5,800,695 A 9/1998 Kang et al.
(Continued)

FOREIGN PATENT DOCUMENTS

EP 1043480 A2 10/2000
EP 1076106 A1 2/2001
(Continued)

OTHER PUBLICATIONS

International Search Report and Written Opinion for related International Application No. PCT/US13/68750; report dated Nov. 6, 2013.
(Continued)

*Primary Examiner* — William P Fletcher, III
(74) *Attorney, Agent, or Firm* — Cantor Colburn LLP (57) ABSTRACT

A method for filling cooling holes in a component of a gas turbine engine is disclosed. The component may include a plurality of first cooling holes extending through the wall of the component. The method may comprise the steps of exposing the outer surface of the component, filling the plurality of first cooling holes with a polyimide, curing the polyimide to block the passage of cooling fluid through the plurality of first cooling holes, and applying a thermal bather coating over the outer surface of the component. The method may further include the step of installing a second plurality of cooling holes in the wall of the component wherein the plurality of second cooling holes penetrate the thermal barrier coating and the wall of the component and allow cooling fluid to pass therethrough.

14 Claims, 4 Drawing Sheets

(51) Int. Cl.
*C23C 4/02* (2006.01)
*F01D 5/00* (2006.01)
*F01D 5/28* (2006.01)
*B23P 6/00* (2006.01)

(52) U.S. Cl.
CPC .............. *F23R 3/002* (2013.01); *B23P 6/007* (2013.01); *B23P 2700/06* (2013.01); *B23P 2700/13* (2013.01); *F05D 2230/42* (2013.01); *F05D 2230/80* (2013.01); *F05D 2230/90* (2013.01); *F05D 2300/434* (2013.01); *F23R 2900/00016* (2013.01); *F23R 2900/00019* (2013.01)

(58) Field of Classification Search
CPC . C23C 4/02; F01D 5/005; B23P 6/007; B23P 2700/06; B23P 2700/13
USPC ................ 427/230–239; 60/754; 156/293
See application file for complete search history.

(56) References Cited

U.S. PATENT DOCUMENTS

| | | | | |
|---|---|---|---|---|
| 5,902,647 | A * | 5/1999 | Venkataramani | B05D 1/32 427/142 |
| 6,173,491 | B1 * | 1/2001 | Goodwater | B23P 6/002 29/889.1 |
| 6,265,022 | B1 * | 7/2001 | Fernihough | F01D 5/28 29/889.1 |
| 6,335,078 | B2 * | 1/2002 | Venkataramani | 428/131 |
| 6,758,958 | B1 | 7/2004 | Brooks | |
| 8,057,181 | B1 | 11/2011 | Liang | |
| 2001/0007708 | A1 | 7/2001 | Venkataramani et al. | |
| 2003/0037436 | A1 | 2/2003 | Ducotey, Jr. et al. | |
| 2006/0266285 | A1 | 11/2006 | Fernihough et al. | |
| 2009/0324841 | A1 | 12/2009 | Arrell et al. | |
| 2012/0052200 | A1 * | 3/2012 | Zimmerman | C23C 4/02 427/248.1 |
| 2012/0088064 | A1 * | 4/2012 | Bolz | C23C 14/042 428/131 |
| 2012/0124832 | A1 | 5/2012 | Bunker et al. | |
| 2014/0166255 | A1 * | 6/2014 | Bogue | F02C 7/12 165/168 |

FOREIGN PATENT DOCUMENTS

| | | |
|---|---|---|
| EP | 1350860 A1 | 10/2003 |
| EP | 1365039 A1 | 11/2003 |
| EP | 1655454 A1 | 5/2006 |
| EP | 2078578 A1 | 7/2009 |
| EP | 2196555 A1 | 6/2010 |
| WO | 9835917 A1 | 8/1998 |

OTHER PUBLICATIONS

Saldivar-Guerra, E et al. Processing of Polymer Solutions. In: Handbook of Polymer Synthesis, Characterization, and Processing. John Wiley & Sons, Mar. 2013, pp. 483 [online], [retrieved on Feb. 13, 2014]. Retrieved from the Internet<URL: http://books.google.com/books?hl=en&lr=&id=42ZuuiZjaxwC&oi=fnd&pg=PR7&dq=Handbook+of+Polymer+Synthesis,+Characterization,+and+Processing&ots=qUtLFAB5 978-0-470-63032-7>; p. 483, col. 2, paragraph 2.
European Search Report for European Application No. 13864840.7, dated Jun. 28, 2016, 8 pages.

* cited by examiner

CLOSURE OF COOLING HOLES WITH A FILLING AGENT

FIELD OF THE DISCLOSURE

The present disclosure generally relates to a gas turbine engine and, more particularly, relates to the closure of cooling holes of a component within a gas turbine engine.

BACKGROUND OF THE DISCLOSURE

A gas turbine engine commonly includes a fan section, a compressor, at least one combustor, and a turbine. The compressor and turbine each include a number of rows of blades attached to a rotating cylinder. In operation, the air is pressurized in a compressor and is then directed toward the combustor. Fuel is continuously injected into the combustor together with the compressed air. The mixture of fuel and air is ignited to create combustion gases that enter the turbine, which is rotatably driven as the high temperature, high pressure combustion gases expand in passing over the blades forming the turbine. Since the turbine is connected to the compressor via a shaft, the combustion gases that drive the turbine also drive the compressor, thereby restarting the ignition and combustion cycle.

Since the gas turbine engine operates at high temperatures, certain components of the gas turbine engine, such as linear flowpath liners, the turbine, combustor and augmentor, are directly exposed to hot combustion gases, the temperatures of which sometimes exceed the melting temperature of the materials used in the engine components in contact with these hot gases. To prevent damage to the components, solutions are needed to shield the components from excessive heat.

One common solution is to protect the affected surfaces of the components with a coating system, for example, an aluminide coating or a thermal barrier coating (TBC) which typically includes a metallic bond coat and a layer of ceramic deposited on the bond coat layer. A typical metallic bond coat includes, for example, MCrAlY, wherein M is Ni, Co, Fe or mixtures thereof. The bond coat provides oxidation and corrosion resistance, as well as accommodates residual stresses which might develop in the coating system. A commonly applied TBC material is yttria stabilized zirconia (YSZ) which exhibits resistance to thermal shock and thermal fatigue even at 1150° C. (2102° F.). Methods, such as air plasma spraying (APS), low pressure plasma spraying (LPPS), or a physical vapor deposition (PVD) process such as electron beam physical vapor deposition (EBPVD) are typically used to deposit the ceramic layer on the bond coat.

In addition to applying a TBC system to the surface of the affected components, internal cooling of selected engine components, such as turbine blades, nozzles, and liners is employed to further protect the underlying component substrates. To accomplish effective cooling, a complex cooling scheme is usually installed which forces bleed air to exit from cooling holes on the flowpath surface and form a suitable film of cooling air over the flowpath surface.

When a TBC is damaged during operation or when a new design of TBC needs to be installed, the old TBC often needs be removed before the new TBC is applied. However, the presence of open cooling holes on the exposed surface of the engine component after the removal of the old TBC layer poses a significant problem for the application of a new, high quality TBC layer. Specifically, a non-uniform (or uncompacted) surface coating susceptible to spallation frequently results when a new TBC layer is directly applied over pre-existing open cooling holes remaining after removal of the old TBC layer. In particular, since the new cooling holes are drilled to meter a specific quantity of cooling air on the engine component after a new TBC layer is applied, any subsequent coating spallation may lead to opening of the pre-existing cooling holes and cause an increase in cooling air flow on the component, as cooling air flow is metered by the size and quantity of the cooling holes. The increase in cooling air flow on the component may subsequently starve other downstream components of cooling air causing the downstream components to suffer from structural damage associated with operating at higher than designed temperatures.

It is known that a typical braze repair process may be used to obstruct (block) old cooling holes. One problem with the brazing approach is that the braze material will incrementally lower the incipient melting temperature of areas of inhomegeneous chemistry in the metal alloy of the component, especially on castings, due to diffusion of boron or silicon into the base metal alloy from the braze material. A second problem with brazing is that wrought alloy properties will be reduced by exposure to brazing procedures. Lower melting brazes could be prone to re-melting with a possibility of re-solidifying elsewhere on metal alloys adversely affected by exposure to the low melting braze constituents. Welding attempts of the old set of cooling holes has proven to introduce substantial distortion into the part associated with solidification of the welds. For both weld and braze repairs, precipitation hardenable alloys such as Iconel 718 or Waspoloy will usually be distorted by the post weld/braze heat treatment required to restore the alloy to a serviceable condition.

To better address the challenges raised by the gas turbine industry to produce reliable and high performance gas turbine engines, an in particular, to provide engines with better designed cooling holes, it is desirable to provide a method for filling cooling holes. Specifically, a method which effectively blocks cooling holes of the component of interest to produce a durable component surface before application of a new TBC is desired. It is also desirable that the materials used to block the cooling holes do not induce any detrimental effects in the substrate.

SUMMARY OF THE DISCLOSURE

In accordance with one aspect of the present disclosure, a method for filling cooling holes in a component of a gas turbine engine is disclosed. The component may have an outer surface and an inner surface and at least one first cooling hole. The first cooling hole may extend between the outer surface and the inner surface of the component. The method may comprise the steps of: exposing the outer surface of the component, filling the first cooling hole with a polyimide, and curing the polyimide to block the first cooling hole.

In another refinement, the polyimide may be a polyimide adhesive, a polyimide film adhesive, or a polyimide thermoplastic.

In another refinement, the step of exposing the outer surface of the component may comprise the step of removing a first thermal barrier coating from the outer surface of the component.

In another refinement, the first thermal barrier coating may comprise a first ceramic top coating overlying a first metallic bond coating.

In another refinement, the method may further comprise the step of installing a second cooling hole after the step of curing the polyimide. The second cooling hole may extend between the outer surface and the inner surface of the component and allow cooling fluid to pass therethrough.

In another refinement, the method may further comprise the step of applying a second thermal barrier coating over the outer surface of the component after the step of curing the polyimide and prior to the step of installing the second cooling hole.

In another refinement, the second thermal barrier coating may comprise a second ceramic top coating overlying a second metallic bond coating.

In another refinement, the second cooling hole may extend between the second thermal barrier coating and the inner surface of the component and allow cooling fluid to pass therethrough.

In another refinement, the method may further comprise the step of removing excess polyimide from the outer surface of the component prior to the step of curing the polyimide to level the outer surface for application of the second thermal barrier coating.

In another refinement, the method may comprise the step of removing excess polyimide after the step of curing the polyimide to level the outer surface for application of the second thermal barrier coating.

In another refinement, the step of curing the polyimide may obstruct the passage of cooling fluid through the first cooling hole.

In another refinement, the polyimide may be capable of withstanding a temperature of about 300° C. without deterioration during the operation of the gas turbine engine.

In another refinement, the step of filling the first cooling hole with a polyimide may be performed by applying a polyimide film to the outer surface of the component and applying pressure to the polyimide film to fill the first cooling hole with the polyimide film.

In another refinement, the step of filling the first cooling hole with a polyimide may be performed by applying a polyimide film to the outer surface of the component and applying a vacuum to pull the polyimide film through the first cooling hole.

In another refinement, the step of filling the first cooling hole with a polyimide may be performed by applying the polyimide to the first cooling hole with a brush or a roller.

In another refinement, the step of filling the first cooling hole with a polyimide may be performed by screeding.

In accordance with another aspect of the present disclosure, a method for filling cooling holes in a component of a gas turbine engine is disclosed. The component may have an outer surface and an inner surface and a plurality of first cooling holes. The plurality of first cooling holes may extend between the outer surface and the inner surface of the component. The method may comprise the steps of: exposing the outer surface of the component, filling the plurality of first cooling holes with a polyimide, curing the polyimide to block the plurality of first cooling holes, and applying a thermal barrier coating over the outer surface of the component.

In another refinement, the step of exposing the outer surface of the component may comprise the step of removing a first thermal barrier coating from the outer surface of the component.

In another refinement, the thermal barrier coating may comprise a ceramic top coating overlying a metallic bond coating.

In another refinement, the method may further comprise the step of installing a plurality of second cooling holes, the plurality of second cooling holes penetrating the thermal barrier coating and extending between the outer surface and the inner surface of the component.

In another refinement, the first thermal barrier coating may comprise a first ceramic top coating overlying a first metallic bond coating.

In accordance with another aspect of the present disclosure, a component of a gas turbine engine is disclosed. The component may have a plurality of first cooling holes extending between an outer surface and an inner surface of the component. The plurality of first cooling holes may be filled with a polyimide and the polyimide may be cured to solid form to block the flow of cooling fluid through the plurality of first cooling holes. The outer surface of the component may be coated with a thermal barrier coating. The component may further comprise a plurality of second cooling holes that extend between the thermal barrier coating and the inner surface of the component and allow cooling fluid to pass therethrough.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of ceramic spray shield or gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
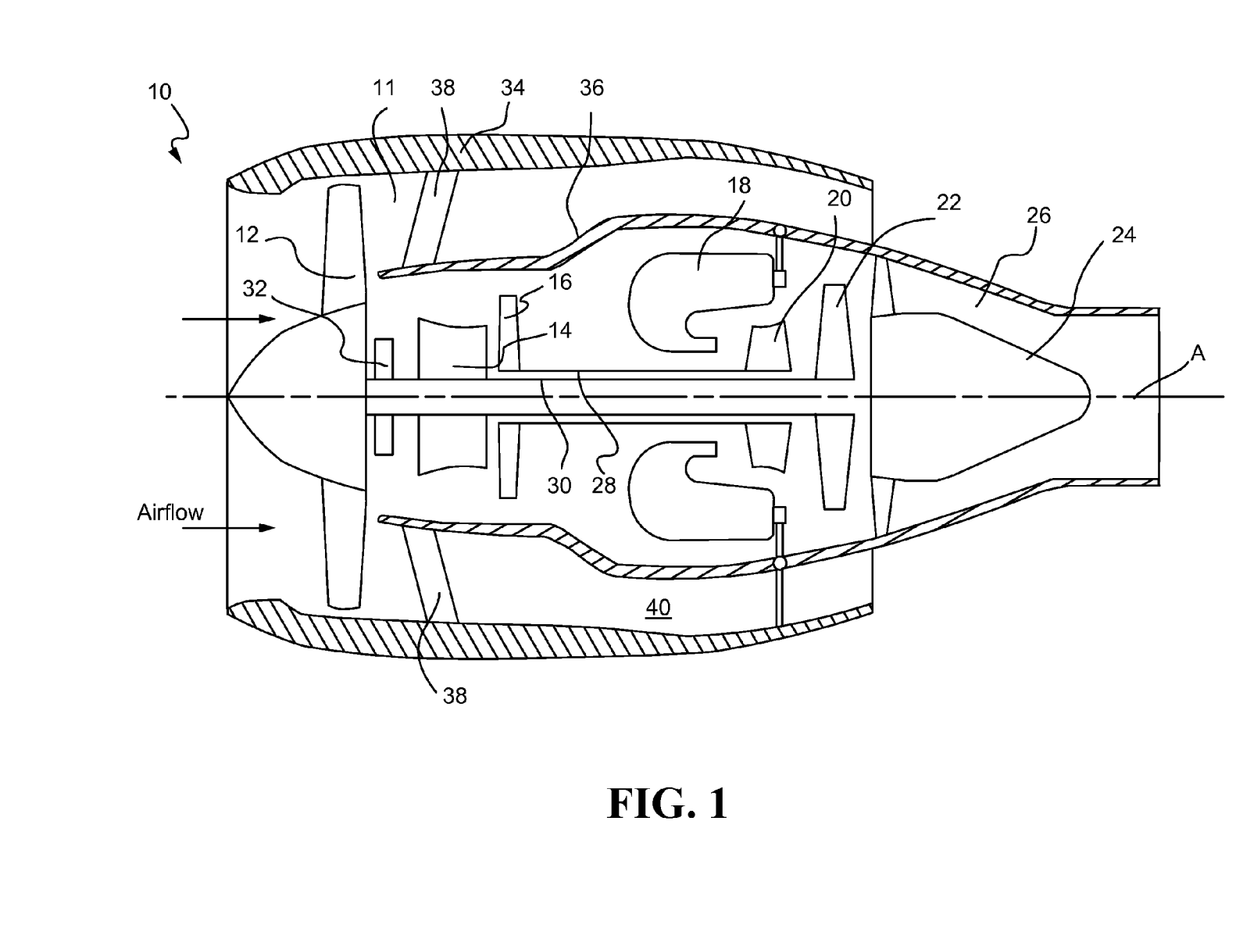
FIG. 1 is a schematic cross-sectional view of an exemplary gas turbine engine.

Referring now to the drawings, and with specific reference to FIG. 1, there is depicted an exemplary gas turbine 10 wherein various embodiments of the present disclosure may be utilized. In this example, the industrial gas turbine 10 may include a compressor section 11 which may comprise, sequentially from the forefront of the gas turbine engine 10, a fan 12, a low pressure compressor 14, a high pressure compressor 16, a combustor chamber 18 downstream of the compressor section 11, a high pressure turbine 20 and a low pressure turbine 22 both downstream of the combustor chamber 18, a tail cone 24, and an exhaust nozzle 26. Further, a high pressure shaft 28 may couple the high pressure compressor 16 with the high pressure turbine 20, while a low pressure shaft 30 may couple the low pressure compressor 14 with the low pressure turbine 22. Both shafts 28 and 30 may be rotatable about an axis A. The low pressure shaft 30 may drive the fan 12 through a gear train 32. On the outside, a fan nacelle 34 may surround both the fan 12 and a core nacelle 36, and may support the core nacelle 36 through pylon structures 38 commonly referred to as upper and lower bifurcations. The core nacelle may house the compressors 14 and 16, the combustor chamber 18, the turbines 20 and 22, and the tail cone 24.

In the example shown in FIG. 1, the engine 10 may be a high bypass turbofan arrangement. During operation, part of the air suctioned by the fan 12 may bypass the core nacelle 36 and enter a generally annular bypass flow path 40, which is arranged between the confines of the fan nacelle 34 and core nacelle 36. The rest of air may be directed into the core nacelle 36, pressurized in the compressors 14 and 16, and mixed with fuels in the combustor 18 to generate hot gases. The hot gases may expand in and flow through the turbines 20 and 22, which extract energy from the hot gases. The turbines 20 and 22 may then power the compressors 14 and 16 as well as the fan 12 through rotor shafts 28 and 30. Finally, the exhaust gases may exit the gas turbine engine through the exhaust nozzle 26. In power generation applications, the turbines 20 and 22 may connect to an electric generator to generate electricity. In aerospace applications, the exhaust of the turbine 10 can be used to create thrust.

The annular outer and inner liners (not shown) of the combustion chamber 18 bounds the combustion process during operation. A portion of the pressurized cooling air is diverted from compressor 16 and is channeled around the annular outer and inner liners to facilitate cooling during operation. Cooling air is metered through small apertures in the liners to establish a film of cooler air to further reduce the temperature of the liner walls.

Figure 2:
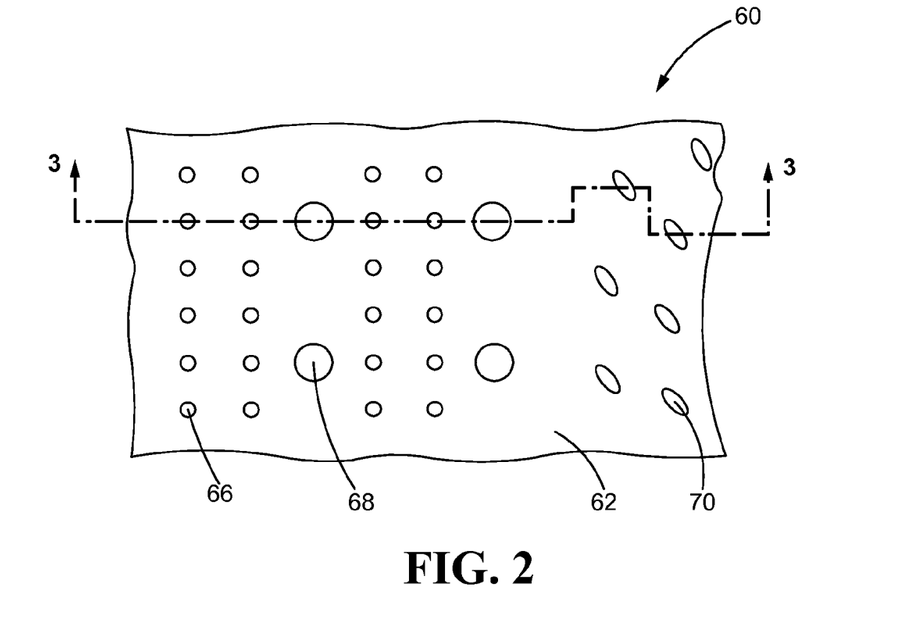
FIG. 2 illustrates a top perspective view of a substrate wall that may be modified according to the present disclosure.

Turning now to FIG. 2, a top perspective view of a substrate wall 60 is illustrated. The substrate wall 60 may be modified by the present method and may be used with or form a part of components within gas turbine engine 10 (shown in FIG. 1), such as, but not limited to, the various engine components described above. For example, the substrate wall 60 may be used with or form a part of components such as, but not limited to, liner flowpath panels, combustor liners, ducts, and nozzles. In addition, the substrate wall 60 may be made from a superalloy metal having the ability to withstand high temperatures during operation of engine. For example, the substrate wall 60 may be made from, but is not limited to, materials such as nickel or cobalt based superalloys. For liners and ducts further downstream, air stream temperature drops, so alloys with lower temperature capabilities such as, but not limited to, corrosion resistant steel or titanium may also be used.

Figure 3:
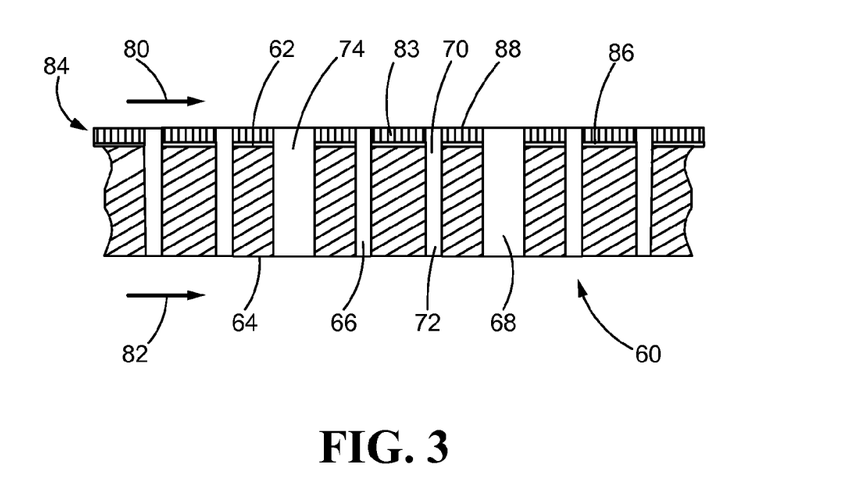
FIG. 3 is a side cross-sectional view through the section 2-2 of FIG. 2, illustrating the substrate wall, in accordance with the present disclosure.

FIG. 3 is a side cross-sectional view through the section 3-3 of FIG. 2, illustrating substrate wall 60. As shown in FIG. 3, the substrate wall 60 may include an outer surface 62 and an opposite inner surface 64. The wall 60 may be perforated or porous and may include a plurality of cooling holes 66, 68 and 70 which are distributed in a spaced relationship across wall 60, as shown. The cooling holes 66, 68, and 70 may extend between the outer and inner surfaces 62 and 64, as shown. Further, although the shapes of the cooling holes may be a circle or an oval as shown in FIG. 2, other shapes and relative orientations of the cooling holes are possible.

As shown in FIG. 3, each cooling hole 66, 68, and 70 may include an exhaust side 72 and an opposite inlet side 74. Although cooling holes 66, 68, and 70 are shown extending substantially perpendicularly through the substrate wall 60 with respect to the surface 62, cooling holes 66, 68, and/or 70 may be obliquely oriented with respect to the surface 62 or may adopt various other orientations as well.

As illustrated in FIGS. 2-3, the cooling holes 66, 68, and 70 may be substantially cylindrical and may have a diameter, for example, between about 0.02 mm and about 0.1 mm, between about 0.1 mm and about 0.4 mm, between about 0.4 and about 0.7 mm, between about 0.7 mm and about 1.0 mm, and between 1.0 mm and about 1.5 mm. Other dimensions are certainly possible. In addition, the cooling holes 66, 68, and 70 may have the same or different diameters with respect to each other.

During operation, combustion gas 80 may flow past the outer surface 62, and cooling fluid 82 may be channeled across the inner surface 64, as shown. Cooling fluid 82 may comprise cooling air or other suitable cooling fluid in gas or liquid form. To insulate the substrate wall 60 from the hot combustion gas 80, the wall outer surface 62 may be covered by a thermal barrier coating (TBC) 84, in whole or in part, as desired. TBC 84 may facilitate protecting the outer surface 62 from the combustion gas 80. TBC 84 may comprise a top coating 83 and a metallic bond coating 86, as shown. The top coating 83 may comprise a ceramic material such as, but not limited to, a thermally resistant yttria stabilized zirconia (YSZ) or another suitable composition. The metallic bond coating 86 may comprise a material that provides oxidation and corrosion resistance and accommodates residual stress. Metallic bond coating 86 may be formed from a metallic material, such as, but not limited to, MCrAlY, wherein M is Ni, Co, Fe, or mixtures thereof. The metallic bond coating 86 may be laminated between outer surface 62 and top coating 83 in order to help enhance the bonding of top coating 83 to the substrate wall 60, as shown.

As shown in FIG. 3, TBC 84 may cover the wall outer surface 62 and may not extend over the cooling hole inlet sides 74. As such, the cooling fluid 82 may be channeled through cooling holes 66, 68, and 70 and through TBC 84 layer to facilitate cooling an outer surface 88 of TBC 84. However TBC 84 may extend over a portion of the cooling hole inlet sides 74 but not block the cooling holes completely.

During engine operation, the original TBC 84 may need to be replaced for various reasons. Sometimes a new pattern of cooling holes may be more desirable or advantageous. Sometimes the original TBC 84 may be damaged and may have to be replaced and/or repaired. Sometimes a TBC coat may need to be applied to an exposed outer surface 62 in order to upgrade the component. However, if a new TBC layer is directly applied over open cooling holes 66, 68, and 70 on an exposed outer surface 62 of substrate 60, then a non-uniform (or uncompacted) metallic bond coat may be formed under the ceramic top coat in the newly applied TBC layer. This may result in a new TBC layer that is susceptible to fragmentation and/or spallation. After new cooling holes are installed in the substrate wall 60, such unwanted spallation could lead to opening of the original cooling holes 66, 68, and 70 and produce a corresponding increase in cooling fluid flow on the substrate 60 which may ultimately cause the starving of other downstream components of cooling fluid. In order to remedy this problem, cooling holes 66, 68, and 70 may be blocked or obstructed with a filling agent after exposing outer surface 62 and before application of a new TBC layer.

Figure 4A:
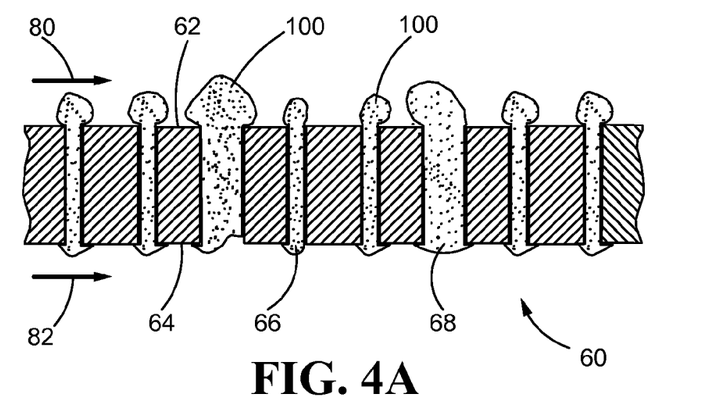
FIG. 4A is a side cross-sectional view of the substrate wall shown in FIG. 3 showing the filling of cooling holes with polyimide.

FIG. 4A shows a side cross-sectional view of substrate wall 60, showing the filling of cooling holes 66 and 68 with filling agent 100 after exposing outer surface 62 by removing the original TBC layer 84. TBC 84 may be removed from the outer surface 62 of the substrate 60 using a method or a process known to a skilled artisan to afford an exposed outer surface 62 of substrate wall 60, as shown. Alternatively, removal of another type of coating on outer surface 62 may be required to expose outer surface 62 if a coating other than a TBC is used. Alternatively, removal of TBC 84 (or another type of coating) may not be required to expose outer surface 62 if a TBC layer is to be applied to outer surface 62 for the first time.

After exposure of outer surface 62, a filling agent 100 may be used to fill the cooling holes 66 and 68, as shown in FIG. 4A. Filling agent 100 may be stable at high temperatures. Filling agent 100 may be a polyimide material such as, but not limited to, a polyimide adhesive, a polyimide film adhesive, or a polyimide thermoplastic. The polyimide composition used to fill the cooling holes may be in the form of a paste or a film. The polyimide material as filling agent 100 may be, for example, an AVIMID® N polyimide such as a FM®680 film adhesive or a BR®680 paste. It may also be a high temperature polyimide such as an AFR-PF4 polyimide. In addition, the polyimide material as filling agent 100 may be a thermoplastic polyimide film such as Kapton® film or a Upilex® film, which is then pressed (by hot pressing) or pulled by vacuum into the cooling holes (see FIG. 4B and further details below).

After filling the cooling holes with filling agent 100, the filling agent 100 may be thermally cured and/or formed at an appropriate temperature such as, for example, between about 300° C. (572° F.) and about 400° C. (752° F.), to provide the solidified filling agent 100. A curing and forming temperature lower than 300° C. (572° F.) may be used if the corresponding polyimide 100 can be obtained at that specific temperature. However, a skilled artisan will understand that depending on the type of filling agent used as well as other conditions such as the type of substrate wall, other curing and forming temperatures and conditions may be appropriate.

Polyimide as filling agent 100 may provide long-term resistance to the atmospheres in the compressors of gas turbine engines, and it may be possible to choose such a polyimide in relation to the specified operating temperature of the engine. For example, it is known that certain polyimides are capable of withstanding temperatures on the order of 300° C. (572° F.) or higher.

As shown in FIG. 4A, the filling agent 100 may completely block the cooling holes 66 and 68 at both ends and may obstruct the passage of cooling fluid through the cooling holes. Alternatively, filling agent 100 may block one end while substantially blocking the other, or substantially block both ends. A skilled artisan can make the necessary decision whether an acceptable degree of blocking is obtained to facilitate the subsequent application of a new TBC layer.

Figure 4B:
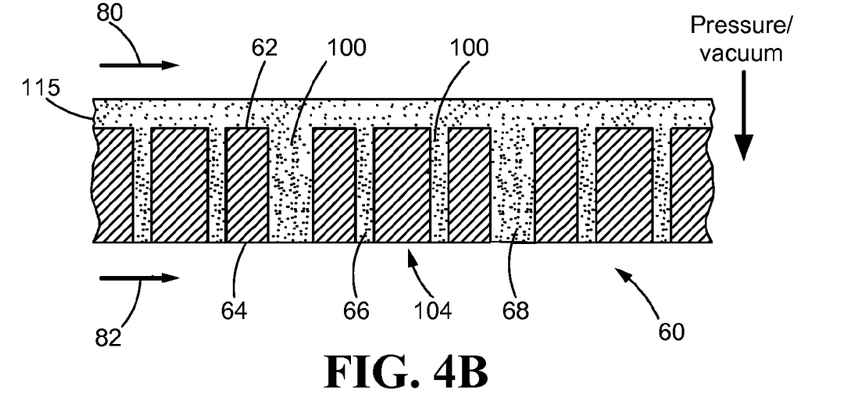
FIG. 4B is a side cross-sectional view of the substrate wall shown in FIG. 3 showing the filling of cooling holes with polyimide by applying a tape-like polyimide film to a surface of the substrate wall and pushing or pulling the polyimide through the cooling holes by applying pressure or vacuum.

The filling agent 100 according to the present disclosure may be suitable for application to substrate wall 60 using conventional techniques such as, for example, either wet or dry application processes. Specifically, the cooling holes may be filled with filling agent 100 by applying the filling agent 100 to the cooling holes 66, 68, and 70 with a brush or a roller. Alternatively, the cooling holes may be filled with filling agent 100 by screeding in which the filling agent 100 is smeared into the cooling holes using a spatula or similar tool. In addition, if a polyimide film adhesive or a polyimide thermoplastic is used as filling agent 100, the filling agent 100 may be applied to the outer surface 62 (or inner surface 64) as a tape-like film 115, which may then be pulled by vacuum to pull filling agent 100 through the cooling holes as shown in FIG. 4B. Alternatively, tape-like film 115 may be hot pressed into the cooling holes by applying pressure to the tape-like film 115 to push filling agent 100 through the cooling holes, as shown in FIG. 4B. Hot pressing or pulling of tape-like film 115 through the cooling holes as shown in FIG. 4B may be performed at an elevated temperature. However, other application processes for filling the cooling holes known to a skilled artisan may be used as well.

Figure 5:
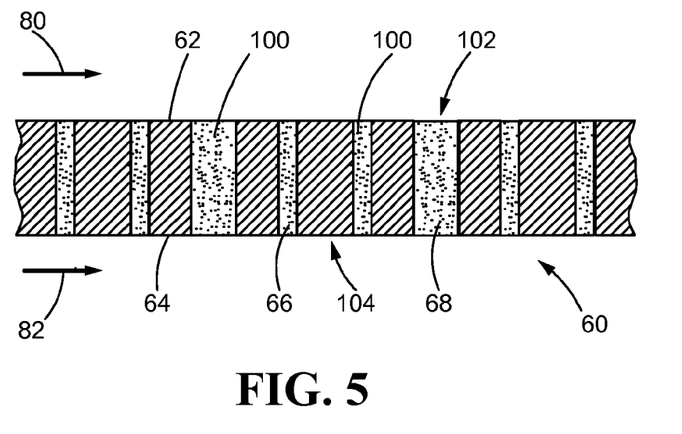
FIG. 5 is a side cross-sectional view of the substrate wall shown in FIG. 4 after the removal of excess polyimide from the inner and outer surfaces of the substrate wall.

After the blocking of cooling holes 66 and 68 with filling agent 100, excess filling agent 100 on the inner and outer surfaces of the substrate wall 60 may be removed by wiping excess filling agent 100 away from the outer and inner surfaces before filling agent 100 cures to reveal the new, leveled outer and inner surfaces 102 and 104, respectively, as shown in FIG. 5. Alternatively, excess filling agent 100 may be removed from the outer and inner surfaces of substrate wall 60 by abrasive wiping (i.e., sanding) after the curing step. Alternatively, excess filling agent 100 may be removed only from the outer surface (the surface to be coated) of substrate wall 60 by wiping or abrasive wiping before or after the curing step to reveal a leveled outer surface 102. Nevertheless, after at least the outer surface is leveled and the filling agent 100 has fully cured and dried, a new TBC layer 106 (or another type of coating) may be applied to leveled outer surface 102 as described below. Importantly, obstruction of the cooling holes with the cured filling agent 100 and leveling of the outer surface 102 preferably allows a new metallic bond coat 96 (see FIG. 6) to be applied against a level surface thus achieving an intended degree of structural compactness throughout metallic bond coat 96 that is necessary for avoiding unwanted fragmentation and/or spallation events on the newly applied TBC layer 106.

Figure 6:
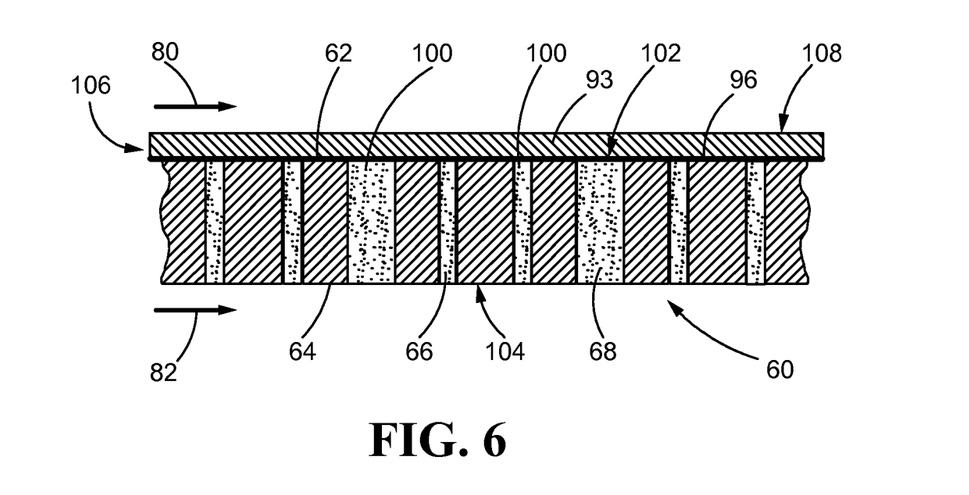
FIG. 6 is a side cross-sectional view of the substrate wall shown in FIG. 5 after the application of a new TBC layer to the outer surface of the substrate wall in accordance with the present disclosure.

Turning now to FIG. 6, a side cross-sectional view of the substrate wall 60 with a newly deposited TBC 106 layer is shown. Alternatively, another type of coating may be deposited on outer surface 62. The new TBC layer 106 (or other coating) may completely cover the cured filling agent 100 on outer surface 102, as shown. The deposition method for application of the new TBC layer 106 may be a thermal spray technique or a physical vapor deposition technique or other suitable process. The crude surface of TBC 106 may be polished or otherwise abraded to give an outer surface 108, as shown.

Metallic bond coat 96 may be formed from, but is not limited to, MCrAlY, where M is Ni, Co, Fe, or mixtures thereof. Top coat 93 may be a ceramic material which may adhere to metallic bond coat 96. The ceramic material may comprise a thermally resistant material, such as, but is not limited to, yttria stabilized zirconium (YSZ).

Figure 7:
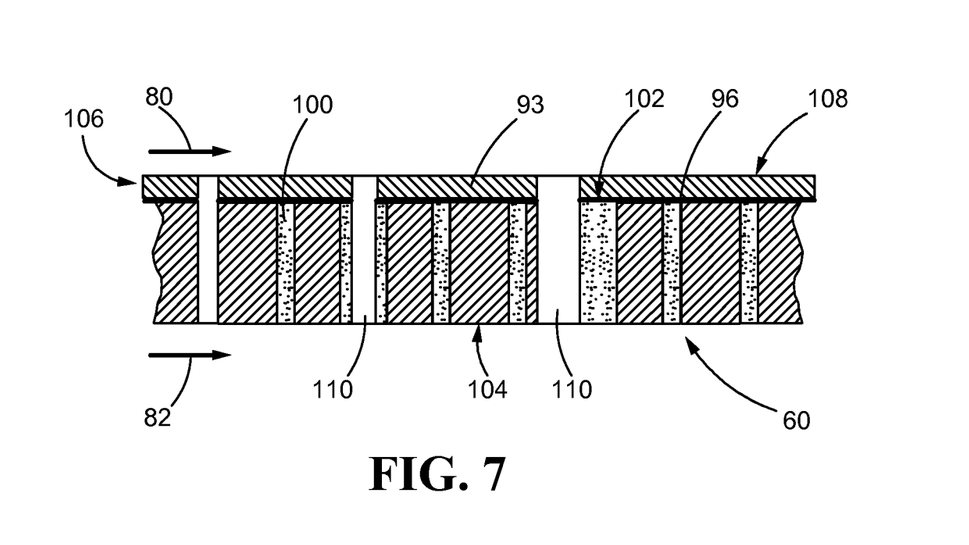
FIG. 7 is a side cross-sectional view of the substrate wall shown in FIG. 6 after the installation of new cooling holes in accordance with the present disclosure.

After the TBC 106 is formed, new cooling holes 110 may be installed into substrate wall 60 as shown in FIG. 7. The cooling holes 110 may be installed by a laser or other suitable installation method. Further, the new cooling holes 110 may extend between the outer and inner surfaces 108 and 104, respectively, as shown. The new cooling holes 110 may be drilled through the old cooling holes 66, 68, and 70, may be drilled through part of the old cooling holes 66, 68, and 70, or may be drilled through substrate wall portions outside the old cooling holes 66, 68, and 70, as shown in FIG. 7. Furthermore, the old cooling holes 66, 68, and 70, now obstructed with filling agent 100, may retain enough structure after the installation of new cooling holes 110 such that cooling fluid only passes through new cooling holes 110. Although FIG. 7 shows cooling holes 110 extending substantially perpendicularly through substrate wall 60 with respect to outer and inner surfaces 108 and 104, the new cooling holes 110 may be obliquely oriented with respect to surfaces 108 and 104 or may adopt other orientations as well. The shapes, sizes, and orientations of the new cooling holes 110 may be determined by the skilled artisan according to each application.

INDUSTRIAL APPLICABILITY

From the foregoing, it can be seen that the present disclosure describes closure of cooling holes with polyimide filling agent and gas turbine engines using thereof. Such method of blocking the cooling holes and processes to improve or repair gas turbine engines may find industrial applicability in many applications including, but not limited to, aerospace applications such as airplanes.

Current trends in gas turbine engine design are requiring a flexible approach to modify or fill cooling holes in substrate walls. By taking advantage of the sealant ability of polyimide, its thermal stability, its ability to obstruct air flow passage through the cooling holes when cured, and its ability in the cured state to provide engine component walls with structural compactness such that newly applied TBC layers are associated with spallation resistance, the present disclosure provides a novel, efficient, and low cost method to fill cooling holes and may be applied for replacement, repair, or installation of TBC layers in gas turbine engine components. Since the modification may generate a modified substrate wall having a new TBC with a new pattern for cooling holes, the present disclosure is advantageous when compared to manufacturing a new substrate wall from scratch. Furthermore, since the polyimide materials left in the new structure wall have good thermal stability during operation, it may become part of the new structure without the need to remove them. Moreover, using the novel strategy to repair and modify the structure wall according to the present disclosure opens up new possibilities for gas turbine engines which may reduce costs associated with time-consuming, inflexible, and expensive manufacturing processes.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. method for filling cooling holes in a component of a gas turbine engine, the component having an outer surface and an inner surface and at least one first cooling hole, the first cooling hole extending between the outer surface and the inner surface of the component, the method comprising the steps of:
   exposing the outer surface of the component by removing a first thermal barrier coating;
   filling the first cooling hole with a polyimide;
   curing the polyimide to block the first cooling hole;
   applying a second thermal barrier coating over the outer surface of the component and completely covering the cured polyimide, wherein excess polyimide is removed to provide a polyimide surface level with the outer surface prior to application of the second thermal barrier coating; and
   installing a second cooling hole after the step of curing the polyimide, the second cooling holed extending between the outer surface and the inner surface of the component and allowing cooling fluid to pass there-through, wherein the second cooling hole is installed through only part of the first cooling hole or outside the first cooling hole.

2. The method of claim 1 wherein the second thermal barrier coating comprises a second ceramic top coating overlying a second metallic bond coating.

3. The method of claim 1 wherein the second cooling holed further penetrates the second thermal barrier coating and allows cooling fluid to pass therethrough.

4. The method of claim 1 wherein removing excess polyimide from the outer surface of the component occurs prior to the step of curing the polyimide.

5. The method of claim 1 wherein removing excess polyimide occurs after the step of curing the polyimide.

6. The method of claim 1 wherein the step of curing the polyimide to block the first cooling hole obstructs the flow of cooling fluid through the first cooling hole.

7. The method of claim 1 wherein the polyimide is capable of withstanding a temperature of about 300° C. without deterioration during operation of the gas turbine engine.

8. The method of claim 1 wherein the step of filling the first cooling hole with a polyimide is performed by hot pressing the polyimide into the first cooling hole.

9. The method of claim 1 wherein the step of filling the first cooling hole with a polyimide is performed by applying the polyimide to the first cooling hole with a tool selected from the group consisting of a brush and a roller.

10. The method of claim 1 wherein the step of filling the first cooling hole with a polyimide is performed by screeding.

11. A method for filling cooling holes in a component of a gas turbine engine, the component having an outer surface and an inner surface and a plurality of first cooling holes, the plurality of first cooling holes extending between the outer surface and the inner surface of the component, the method comprising the steps of:
   exposing the outer surface of the component;
   filling the plurality of first cooling holes with a polyimide;
   curing the polyimide to block the plurality of first cooling holes;
   applying a thermal barrier coating over the outer surface of the component and completely covering the cured polyimide, wherein excess polyimide is removed to provide a polyimide surface level with the outer surface prior to application of the thermal barrier coating; and
   installing a plurality of second cooling holes, the plurality of second cooling holes penetrating the thermal barrier coating and extending between the outer surface and the inner surface of the component, wherein the plurality of second cooling holes are installed through only part of the first cooling holes or outside the first cooling holes.

12. The method of claim 11 wherein the step of exposing the outer surface of the component comprises the step of removing a first thermal barrier coating from the outer surface of the component.

13. The method of claim 12 wherein the first thermal barrier coating comprises a first ceramic top coating overlying a first metallic bond coating.

14. The method of claim 11 wherein the thermal barrier coating comprises a ceramic top coating overlying a metallic bond coating.

* * * * *